United States Patent
Guim Bernat et al.

(10) Patent No.: US 10,838,647 B2
(45) Date of Patent: Nov. 17, 2020

(54) ADAPTIVE DATA MIGRATION ACROSS DISAGGREGATED MEMORY RESOURCES

(71) Applicant: INTEL CORPORATION, Santa Clara, CA (US)

(72) Inventors: Francesc Guim Bernat, Barcelona (ES); Karthik Kumar, Chandler, AZ (US); Thomas Willhalm, Sandhausen (DE); Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 15/921,346

(22) Filed: Mar. 14, 2018

(65) Prior Publication Data

US 2019/0042138 A1    Feb. 7, 2019

(51) Int. Cl.
*G06F 3/06* (2006.01)
*G06F 11/30* (2006.01)
*G06F 11/34* (2006.01)

(52) U.S. Cl.
CPC ........... *G06F 3/0647* (2013.01); *G06F 3/067* (2013.01); *G06F 3/0614* (2013.01); *G06F 11/3034* (2013.01); *G06F 11/3452* (2013.01)

(58) Field of Classification Search
CPC .... G06F 3/0647; G06F 3/067; G06F 11/3034; G06F 3/0614; G06F 11/3452; G06F 3/061; G06F 11/30; G06F 3/06
USPC ................................................. 711/165, 114
See application file for complete search history.

(56) References Cited

U.S. PATENT DOCUMENTS

| | | | |
|---|---|---|---|
| 9,578,088 B2 * | 2/2017 | Nickolov | G06F 9/4856 |
| 9,898,224 B1 * | 2/2018 | Marshak | G06F 3/0647 |
| 9,910,618 B1 * | 3/2018 | Curley | G06F 11/2092 |
| 9,940,033 B1 * | 4/2018 | Alshawabkeh | G06F 11/3485 |
| 2003/0158884 A1 | 8/2003 | Alford, Jr. | |
| 2005/0005018 A1 | 1/2005 | Datta | |
| 2006/0200795 A1 | 9/2006 | MacLay | |
| 2007/0271570 A1 | 11/2007 | Brown et al. | |
| 2008/0271038 A1 | 10/2008 | Rolia et al. | |

(Continued)

OTHER PUBLICATIONS

Y. Kwon and M. Rhu, "A Disaggregated Memory System for Deep Learning," in IEEE Micro, vol. 39, No. 5, pp. 82-90, Sep. 1-Oct. 2019.*

(Continued)

*Primary Examiner* — Pierre Miche Bataille
(74) *Attorney, Agent, or Firm* — Compass IP Law PC

(57) ABSTRACT

Devices and systems for distributing data across disaggregated memory resources is disclosed and described. An acceleration controller device can include an adaptive data migration engine (ADME) configured to communicatively couple to a fabric interconnect, and is further configured to monitor application data performance metrics at the plurality of disaggregated memory pools for a plurality of applications executing on the plurality of compute resources, select a current application having a current application data performance metric, determine an alternate memory pool from the plurality of disaggregated memory pools estimated to increase application data performance relative to the current application data performance metric, and migrate the data from the current memory pool to the alternate memory pool.

22 Claims, 4 Drawing Sheets

(56) References Cited

U.S. PATENT DOCUMENTS

| | | | |
|---|---|---|---|
| 2008/0294728 A1 | 11/2008 | Batthish et al. | |
| 2010/0017506 A1 | 1/2010 | Fadell | |
| 2010/0094948 A1 | 4/2010 | Ganesh et al. | |
| 2010/0095299 A1 | 4/2010 | Gupta et al. | |
| 2010/0115095 A1 | 5/2010 | Zhu et al. | |
| 2010/0333105 A1 | 12/2010 | Horvitz et al. | |
| 2011/0107334 A1 | 5/2011 | Kapoor et al. | |
| 2011/0126203 A1 | 5/2011 | Fahrig | |
| 2011/0202655 A1 | 8/2011 | Sharma et al. | |
| 2011/0302578 A1 | 12/2011 | Isci et al. | |
| 2012/0110582 A1 | 5/2012 | Ferdous et al. | |
| 2012/0266176 A1 | 10/2012 | Vojnovic et al. | |
| 2013/0185433 A1 | 7/2013 | Zhu et al. | |
| 2013/0268940 A1 | 10/2013 | Gmach et al. | |
| 2014/0052706 A1 | 2/2014 | Misra et al. | |
| 2014/0068627 A1 | 3/2014 | Goh et al. | |
| 2014/0075143 A1* | 3/2014 | Matsuya | G06F 12/02 711/170 |
| 2014/0108828 A1 | 4/2014 | Breternitz et al. | |
| 2014/0136452 A1 | 5/2014 | Wellman et al. | |
| 2015/0006817 A1* | 1/2015 | Orikasa | G06F 3/0685 711/114 |
| 2015/0142524 A1 | 5/2015 | Jung et al. | |
| 2015/0150015 A1 | 5/2015 | Fankhauser et al. | |
| 2015/0212873 A1 | 6/2015 | Filho et al. | |
| 2015/0229582 A1 | 8/2015 | Zhu et al. | |
| 2015/0235432 A1 | 8/2015 | Bronder et al. | |
| 2015/0347047 A1* | 12/2015 | Masputra | G06F 3/0649 711/114 |
| 2016/0028649 A1 | 1/2016 | Herington et al. | |
| 2016/0094410 A1 | 3/2016 | Anwar et al. | |
| 2016/0142338 A1 | 5/2016 | Steinder et al. | |
| 2016/0210379 A1 | 7/2016 | Lakshmanan et al. | |
| 2016/0246842 A1 | 8/2016 | Li et al. | |
| 2016/0323880 A1 | 11/2016 | Luo et al. | |
| 2017/0031600 A1* | 2/2017 | Kesavan | G06F 3/0605 |
| 2017/0063973 A1 | 3/2017 | Chawla et al. | |
| 2017/0153925 A1 | 6/2017 | Shakya et al. | |
| 2017/0177222 A1* | 6/2017 | Singh | G06F 9/45558 |
| 2017/0192484 A1 | 7/2017 | Priyadarshi et al. | |
| 2017/0272343 A1 | 9/2017 | Giles | |
| 2017/0286804 A1 | 10/2017 | McCann et al. | |
| 2018/0024860 A1 | 1/2018 | Balle et al. | |
| 2018/0026913 A1 | 1/2018 | Balle et al. | |
| 2018/0293017 A1* | 10/2018 | Curley | G06F 11/2092 |
| 2019/0042122 A1* | 2/2019 | Schmisseur | G06F 9/5044 |
| 2019/0166032 A1* | 5/2019 | Inbaraj | H04L 43/16 |

OTHER PUBLICATIONS

K. Koh, K. Kim, S. Jeon and J. Huh, "Disaggregated Cloud Memory with Elastic Block Management," in IEEE Transactions on Computers, vol. 68, No. 1, pp. 39-52, Jan. 1, 2019.*

K. Katrinis et al., "Rack-scale disaggregated cloud data centers: The dReDBox project vision," 2016 Design, Automation & Test in Europe Conference & Exhibition (DATE), Dresden, 2016, pp. 690-695.*

* cited by examiner

US 10,838,647 B2

ADAPTIVE DATA MIGRATION ACROSS DISAGGREGATED MEMORY RESOURCES

BACKGROUND

Data centers and other multi-node networks are facilities that house a plurality of interconnected computing nodes. For example, a typical data center can include hundreds or thousands of computing nodes, each of which can include processing capabilities to perform computing and memory for data storage. Data centers can include network switches and/or routers to enable communication between different computing nodes in the network. Data centers can employ redundant or backup power supplies, redundant data communications connections, environmental controls (e.g., air conditioning, fire suppression) and various security devices. Data centers can employ various types of memory, such as volatile memory or non-volatile memory.

DESCRIPTION OF EMBODIMENTS

Figure 1:
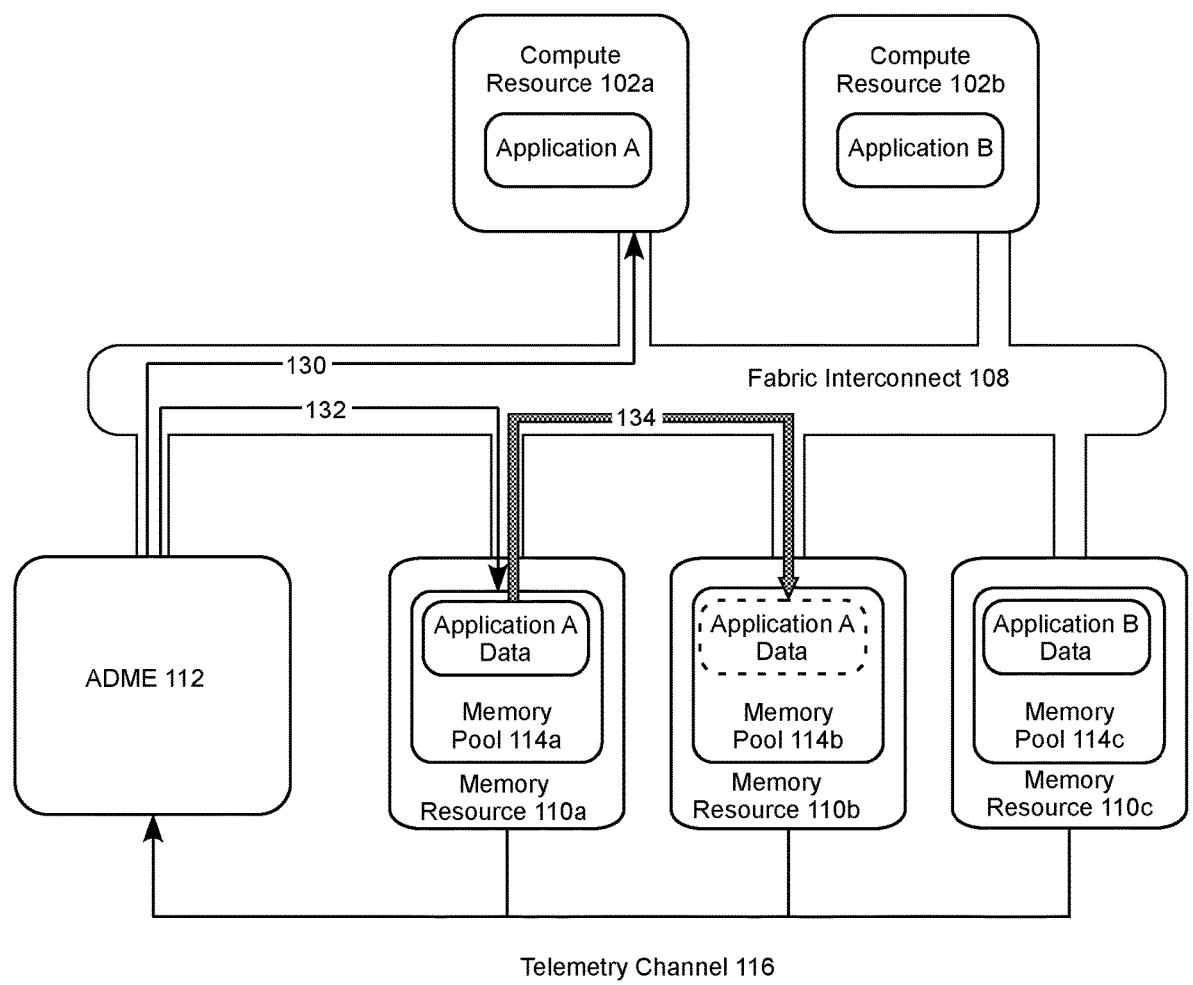
FIG. 1 illustrates a block diagram of a system in accordance with an example embodiment.

Although the following detailed description contains many specifics for the purpose of illustration, a person of ordinary skill in the art will appreciate that many variations and alterations to the following details can be made and are considered included herein. Accordingly, the following embodiments are set forth without any loss of generality to, and without imposing limitations upon, any claims set forth. It is also to be understood that the terminology used herein is for describing particular embodiments only, and is not intended to be limiting. Unless defined otherwise, all technical and scientific terms used herein have the same meaning as commonly understood by one of ordinary skill in the art to which this disclosure belongs. Also, the same reference numerals in appearing in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof. One skilled in the relevant art will also recognize that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of phrases including "an example" or "an embodiment" in various places throughout this specification are not necessarily all referring to the same example or embodiment.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the to region, etc.

An initial overview of embodiments is provided below and specific embodiments are then described in further detail. This initial summary is intended to aid readers in understanding the disclosure more quickly, but is not intended to identify key or essential technological features, nor is it intended to limit the scope of the claimed subject matter.

Data volumes are generally increasing at a significant rate, not only in terms of storage data, but also in terms of dataset sizes. With traditional memory technologies and architectures, increasing dataset sizes necessitate swapping portions of the dataset out to slower storage memory, thus decreasing data access speeds and lowering the processing performance of an associated system. New higher density memory technologies have been developed that, along with architectures to implement such technologies, can accommodate not only increasing data volumes in general, but can also provide memory resource environments that can be scaled to accommodate extremely large datasets. While such can be used to increase memory and system performance over traditional systems, many new memory technologies trend toward increasing memory latencies, as opposed to decreasing memory latencies (compared to dynamic random-access memory (DRAM) on a single node, for example). Many applications, such as in-memory databases for example, can be very sensitive to increased memory latencies.

Additionally, different types of memory technology have distinct properties, such as capacity, hardware cost, and latency. For example, DRAM typically offers relatively fast memory access but is more expensive in terms of bytes per dollar, and as such, is typically available in lower capacities in a compute device. By contrast, other types of memory, such as byte addressable, write-in-place memory (e.g., Intel 3D X Point® memory) is less expensive and, as such, offers larger capacities, but is slower than DRAM. Further, flash memory (e.g., NAND memory) is even less expensive, available in even larger capacities, but is even slower than the aforementioned memory types. Real-time applications, such as in-memory databases are experiencing an explosive growth in memory capacity requirements. For example, an average in-memory database spans seven to eight terabytes of memory, and some extend up to 48 terabytes of memory in a single compute device. Given the cost of DRAM, it can be beneficial for a workload (e.g., an application or process executed to provide services for a customer) to use only the amount of DRAM required to maintain some minimum guarantee of performance. For example, the most frequently accessed data can be placed in DRAM, while the remaining portions of the data can be placed in a slower type of memory. However, the amount of DRAM needed to store the most frequently accessed data may not be known prior to execution of a workload, and an optimal amount of DRAM may change over time as the workload performs different tasks. Allocating either excess amounts or insufficient amounts of memory resources to an application workload can lead to underutilized or improperly utilized memory in the system that can greatly impact performance.

One potential solution provides an application with multiple memory pools, where each memory pool can have different memory access characteristics, such as latencies, bandwidth, and the like. In such an implementation, applications can view all of the memory pools as available memory. It is difficult, however, for an application to know a priori how different portions of an associated dataset may be used, or the impact of the dataset on a given type of memory pool. Additionally, focused bandwidth directed to discrete sections of a memory pool can create hotspots, particularly when other sections of the memory pool, or other memory pools, are not utilized. Many of these issues can be mitigated by migrating data, such as portions of the dataset, to unused sections of the memory pool, or to other memory pools, thus potentially lowering latency and increasing bandwidth.

For example, FIG. 1 illustrates a system shown in very general terms that includes compute resources 102*a,b* (collectively 102) running Applications A and B, respectively. The compute resources 102 can each be independently any type or configuration of compute resource, which is described in more detail below. The compute resources 102 are communicatively coupled to a fabric interconnect 108. The system also includes a plurality of memory resources 110a-c (collectively 110) communicatively coupled to the fabric interconnect 108. The plurality of memory resources 110 further includes a memory pool 114a-c (collectively 114). The memory pools 114 can each be independently any type or configuration of memory or memory resource, which is also described in more detail below. Applications A and B are executed on the respective compute resources 102, and data associated with each application is processed/stored at the memory pools 114. In the case of FIG. 1, Application A data is at memory pool 114a and Application B data is at memory pool 114c. The system can additionally include an adaptive data migration engine (ADME) 112 that is communicatively coupled to the fabric interconnect 108. Each memory resource 110 can send various data traffic and performance metrics over a communication channel such as, for example, a telemetry channel 116, to the ADME 112. The ADME 112 can thus monitor the various metrics of data traffic and performance, such as application data performance, application-specific data traffic, bandwidth, latency, heat, and the like, for example. Furthermore, trends relating to data traffic and performance can be learned by the ADME 112 to further increase the effectiveness of decisions to migrate data (e.g., pages of memory) to other more suitable memory pools. Such a performance-related migration of data, data sets, or portions of data sets that is based on application-specific performance monitoring can greatly increase the efficiency of a system. In the example of a data center, monitoring application-specific performance at each memory pool can increase the usage of under-utilized memory resources. Additionally, such monitoring-based data management allows data sets (or workloads) to be prioritized according to, for example, service level agreements (SLAs) under which data is being processed, quality of service (QoS) goals of the data center, or the like.

As one example, the ADME 112 can determine that the application data performance of Application A Data from Application A at memory pool 114a can be increased by moving or migrating Application A Data to memory pool 114b. As a result, the ADME 112 can send a data migration instruction 132 to memory resource 110a to begin moving (shown at 134) the data to memory pool 114b. Various techniques can be used to migrate the data without causing data coherency or other negative consequences that can occur when moving data of an executing application. In one example, the ADME 112 can send a notification 130 to compute resource 102a to pause the execution of Application A while the data is being migrated. Once the data has been migrated, the ADME 112 can send a notification to compute resource 102a to resume the execution of Application A. In some cases, the ADME 112 can wait for confirmation from the compute resource 102a that Application A has been successfully paused before initiating the migration of the data. In another example, the migration can be accomplished in a manner that is transparent to Application A, in order to, among other things, maintain the performance of Application A during the migration. For example, the ADME 112 can update the pointer(s) in compute resource 102a to point to the new memory location for Application A's data in memory pool 114b in memory resource 110b. Compute resource 102a can then continue to perform read operations from cache while performing write operations to the new memory location, while the remaining data is being migrated. In another example, data that is not currently in use can be migrated to the new data location, and once moved, the pointer(s) to the new memory location can be updated and any dirty data can be written. Regardless of the technique used, in some examples the ADME can additionally provide compute resource 102a with the updated location of the Application A Data at the memory pool 110b.

As such, systems, devices, and methods according to the present disclosure can monitor various aspects of application data performance across any number of disaggregated memory pools in a system to facilitate application-specific data management. This allows application data to be manipulated in a performance-aware manner to thus improve application execution and data processing. In addition to increasing the performance of data execution by an application, the present techniques can be used to spread data from multiple applications across disaggregated memory pools in a shared computing environment, such as a data center, for example. In addition to merely monitoring an aspect of application performance such as application-specific data traffic, for example, trends relating to data traffic can be learned to further increase the effectiveness of the migration of data (e.g., pages of memory) to other suitable memory pools. Such a performance-aware migration of data, data sets, or portions of data sets, that is based on monitoring the performance of the applications executing in a data center can greatly increase the efficiency of the data center, for example, by increasing the usage of under-utilized memory resources.

Figure 2:
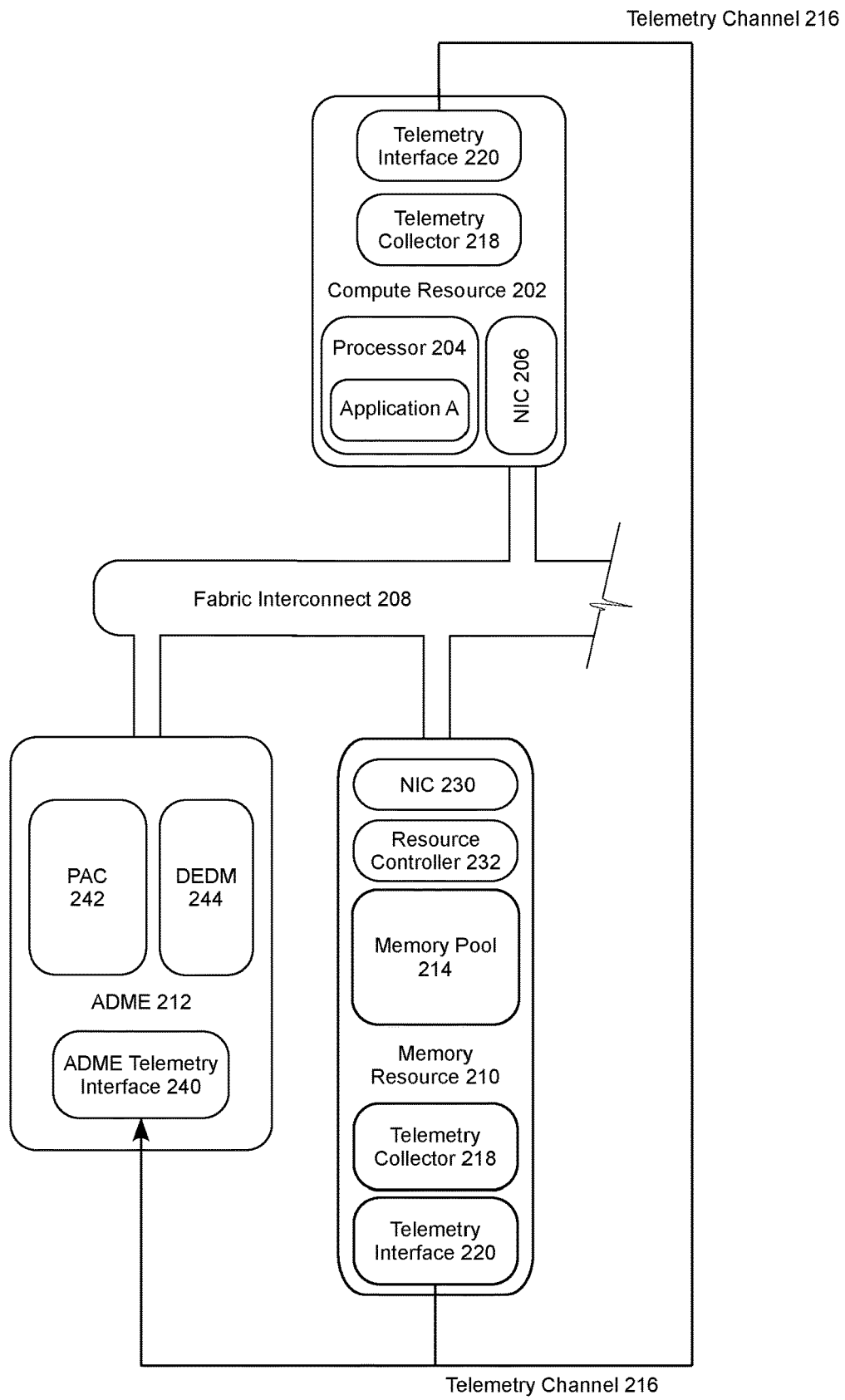
FIG. 2 illustrates a block diagram of a portion of a system in accordance with an example embodiment.

In another example, FIG. 2 shows a block diagram of a portion of a system having an ADME 212, a memory resource 210, and a compute resource 202 communicatively coupled together by a fabric interconnect 208. The compute resource 202 can be any compute resource running an application, where the data associated with the application is at a remote memory resource across a network. Nonlimiting examples can include a compute node, a collection of compute nodes, a host processor, one or more virtual machines (VMs), a compute sled, or the like. The compute resource 202 can include a processor 104, shown running Application A, in this case. Additionally, a compute node in general can include various node components that facilitate or enhance the computation functionality of the compute node, which are not shown for clarity. One of ordinary skill in the art would be aware of such node components, which can include, among other things, local system memory, local storage memory, cache, memory controllers, addressing logic, and the like.

The fabric interconnect 208 can communicate with the compute resource 202 through a compute resource network interface controller (NIC) 206. In addition to providing a communication interface, in some cases the NIC 206 can perform address decoding, message routing, and the like, on incoming and outgoing traffic. For example, the NIC 206 can maintain addresses of any memory pools where application data is located that is associated with applications running on the compute resource 202. The compute resource 202 can include, in some cases, a telemetry collector 218 that is configured to collect or otherwise aggregate various compute resource 202 status and performance metrics to generate operational telemetry data. A telemetry interface 220 can communicatively couple to a telemetry channel 216, thus allowing telemetric communication with other system nodes or resources. The telemetry channel 216 can include communication in-band over the fabric interconnect 208 or communication over an out-of-band (OOB) channel, as is shown in FIG. 2. Nonlimiting examples of OOB channels that can be used to transmit telemetry data include dedicated telemetry channels, system management bus (SMBus) channels, platform environment control interface (PECI) channels, host embedded controller interface (HECI) channels, or the like.

The memory resource 210 can include a memory pool 214, which can include any type or configuration of memory, memory media, memory media configuration, or the like. The memory resource 210 can further include a memory resource NIC 230 communicatively coupled to the fabric interconnect 208, and a resource controller 232. The compute resource 202 and the memory resource 210 can thus communicate through their respective NICs over the fabric interconnect 208. In addition to providing a communication interface, in some cases the NIC 230 can perform address decoding, message routing, and the like, on incoming and outgoing traffic. For example, the NIC 230 can maintain addressing information for the application data located in the memory pool 214. The resource controller 232 controls access to and from the memory pool 214, and can be a part of, or distinct from, the NIC 230. The resource controller 232 can thus receive data transaction requests from the compute resource 202, generate the appropriate memory commands, and perform the requested data transaction on the memory pool 214.

The memory resource 212 can also include a telemetry collector 218 that is configured to collect or otherwise aggregate various status and performance metrics to generate operational telemetry data for application data at the memory resource 210. A telemetry interface 220 can communicatively couple to the telemetry channel 216, thus allowing telemetric communication with other system nodes or resources.

The system can also include an ADME 212 that is communicatively coupled to the compute resource 202 and the memory resource 210 via the fabric interconnect 208. The ADME 212 can include an ADME telemetry interface 240 configured to receive the operational telemetry data, either as individual metrics or in aggregated form. As has been described above, the ADME 212 monitors the application data performance metrics contained in the operational telemetry data in order to make data migration decisions across memory pools that can increase the performances of applications running on compute resources 202. In addition to migrating data associated with a given application to a memory pool that may have a memory configuration more suited to that specific data, the ADME 212 can also migrate data to underutilized memory resources, thus decreasing the amount of unused bandwidth in the system to increase overall performance.

In one example, the ADME 212 can include a programmable acceleration controller (PAC) 242 and a data engine data movement (DEDM) unit 244. The PAC 242 is communicatively coupled to the telemetry interface and thus receives the operational telemetry data through the telemetry channel 216 from the memory pool 210. The operational telemetry data includes application data performance metrics for Application A data at the memory pool 210, which allows the PAC 242 to monitor the memory pool 210 specifically for the Application A data performance. In some cases, the PAC 242 can additionally include operational telemetry data from the compute resource 202, either for the evaluation of Application A performance or for other purposes. The DEDM 244 is communicatively coupled to the PAC 242, which can facilitate the migration of Application A data from memory pool 210 to another memory pool, as is described more fully below.

Figure 3:
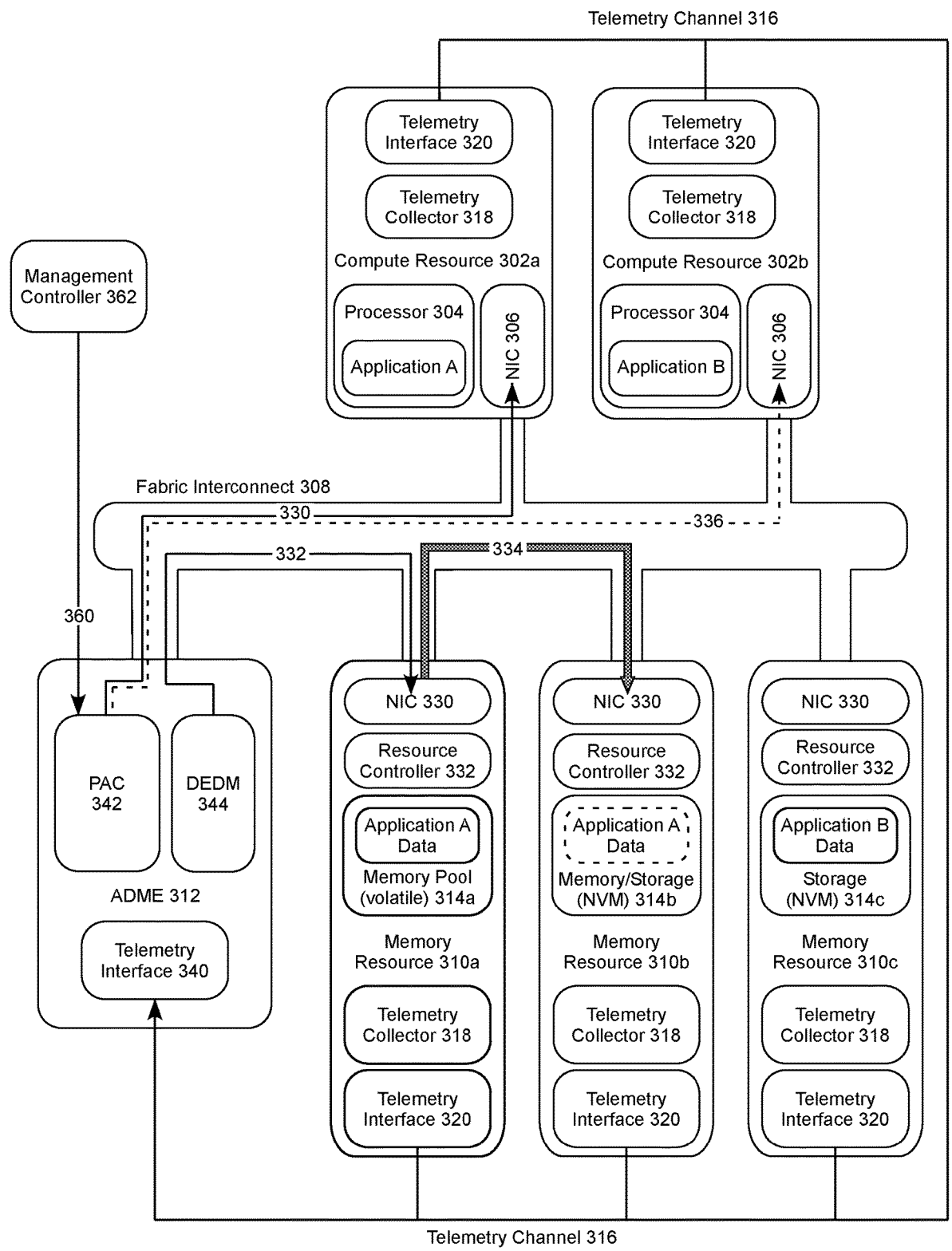
FIG. 3 illustrates a block diagram of a system in accordance with an example embodiment.

FIG. 3 shows a block diagram of an example of a system comprising compute resources 302a,b (collectively 302) running Applications A and B, respectively. The compute resources 302 can each be independently any type or configuration of compute resource, which is not limiting. For example, a compute resource can be a single compute node, a collection of compute nodes running a common application or portion of a common application, one or more virtual machines (VMs), a physically disaggregated pool of compute nodes grouped together by a commonality, such as a common processing task, a common processing priority, a common application, or a common data type, a physically aggregated pool of compute nodes, or the like. As such, "compute resource" can include any grouping of computational units in the system, regardless of complexity. Furthermore, in some examples a compute resource can be dynamically reconfigured as needed to adapt to changing workloads. In some examples, a compute resource can be a compute sled, a compute rack, or any other compute-scale unit of a data center. FIG. 3 shows compute resources 302 configured as compute nodes of the same type for discussion purposes, and thus should not be seen as limiting. Additionally, a system can include any number of compute resources.

Each compute resource 302 shown in FIG. 3 includes a processor 304 and a compute resource network interface controller (NIC) 306, which is communicatively coupled to a fabric interconnect 308. In addition to providing a communication interface, in some cases the NIC 306 can perform address decoding, message routing, and the like, on incoming and outgoing traffic, as has been described herein. The compute resource 302 can also include, in some cases, a telemetry collector 318 that is configured to collect or otherwise aggregate various compute resource 302 status and performance metrics. A telemetry interface 320 can communicatively couple to a telemetry channel 316, thus allowing telemetric communication with other system nodes or resources. The telemetry channel can include communication in-band over the fabric interconnect 308 or communication over an OOB channel, as is shown in FIG. 3. Nonlimiting examples of OOB channels that can be used to transmit telemetry data include dedicated telemetry channels, SMBus channels, PECI channels, HECI channels, or the like.

The fabric interconnect 308 is additionally communicatively coupled to memory resources 310a,b,c (collectively 310) via a corresponding memory resource NIC 330 in each memory resource. The fabric interconnect 308 can include a variety of interconnect technologies, which can vary depending on the system design. Nonlimiting examples can include high-speed fabrics, intelligent fabrics, network fabrics, and the like. Such interconnects, high-speed fabrics, and the like, may be operated according to any Ethernet or other network protocol. In one example, an interconnect can be operated according to Intel® Corporation's Storm Lake (STL) Fabric Technology using the Intel Omni-Path architecture (Intel OPA).

The memory resources 310 can include a memory pool 314a,b,c (collectively 314), which can include various types of memory nodes, storage nodes, and memory/storage nodes, including various types of volatile memory and nonvolatile memory (NVM). Volatile memory is a memory medium that requires power to maintain the state of data stored by the medium. Volatile memory can include any type of volatile memory, nonlimiting examples of which can include random access memory (RAM), such as static random-access memory (SRAM), dynamic random-access memory (DRAM), synchronous dynamic random-access memory (SDRAM), and the like, including combinations thereof. SDRAM memory can include any variant thereof, such as single data rate SDRAM (SDR DRAM), double data rate (DDR) SDRAM, including DDR, DDR2, DDR3, DDR4, DDR5, and so on, described collectively as DDRx, and low power DDR (LPDDR) SDRAM, including LPDDR, LPDDR2, LPDDR3, LPDDR4, and so on, described collectively as LPDDRx. In some examples, DRAM complies with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209B for LPDDR SDRAM, JESD209-2F for LPDDR2 SDRAM, JESD209-3C for LPDDR3 SDRAM, and JESD209-4A for LPDDR4 SDRAM (these standards are available at www.jedec.org; DDR5 SDRAM is forthcoming). Such standards (and similar standards) may be referred to as DDR-based or LPDDR-based standards, and communication interfaces that implement such standards may be referred to as DDR-based or LPDDR-based interfaces. In one specific example, the system memory can be DRAM. In another specific example, the system memory can be DDRx SDRAM. In yet another specific aspect, the system memory can be LPDDRx SDRAM.

NVM is a storage medium that does not require power to maintain the state of data stored by the medium. NVM has traditionally been used for the task of data storage, or long-term persistent storage, but new and evolving memory technologies allow the use of some NVM technologies in roles that extend beyond traditional data storage. One example of such a role is the use of NVM as main or system memory. Nonvolatile system memory (NVMsys) can combine data reliability of traditional storage with low latency and high bandwidth performance, having many advantages over traditional volatile memory, such as high density, large capacity, lower power consumption, and reduced manufacturing complexity, to name a few. Byte-addressable, write-in-place NVM such as three-dimensional (3D) cross-point memory, for example, can operate as byte-addressable memory similar to DRAM, or as block-addressable memory similar to NAND flash. In other words, such NVM can operate as system memory or as persistent storage memory (NVMstor). In some situations where NVM is functioning as system memory, stored data can be discarded or otherwise rendered unreadable when power to the NVMsys is interrupted. NVMsys also allows increased flexibility in data management by providing non-volatile, low-latency memory that can be located closer to a processor in a computing device. In some examples, NVMsys can reside on a DRAM bus, such that the NVMsys can provide ultra-fast DRAM-like access to data. NVMsys can also be useful in computing environments that frequently access large, complex data sets, and environments that are sensitive to downtime caused by power failures or system crashes.

Nonlimiting examples of NVM can include planar or 3D NAND flash memory, including single or multi-threshold-level NAND flash memory, NOR flash memory, single or multi-level phase change memory (PCM), such as chalcogenide glass PCM, planar or 3D PCM, cross-point array memory, including 3D cross-point memory, non-volatile dual in-line memory module (NVDIMM)-based memory, such as flash-based (NVDIMM-F) memory, flash/DRAM-based (NVDIMM-N) memory, persistent memory-based (NVDIMM-P) memory, 3D cross-point-based NVDIMM memory, resistive RAM (ReRAM), including metal-oxide- or oxygen vacancy-based ReRAM, such as $HfO_2$—, $Hf/HfO_x$—, $Ti/HfO_2$-, $TiO_x$—, and $TaO_x$-based ReRAM, filament-based ReRAM, such as $Ag/GeS_2$-, $ZrTe/Al_2O_3$—, and Ag-based ReRAM, programmable metallization cell (PMC) memory, such as conductive-bridging RAM (CBRAM), silicon-oxide-nitride-oxide-silicon (SONOS) memory, ferroelectric RAM (FeRAM), ferroelectric transistor RAM (Fe-TRAM), anti-ferroelectric memory, polymer memory (e.g., ferroelectric polymer memory), magnetoresistive RAM (MRAM), write-in-place non-volatile MRAM (NVMRAM), spin-transfer torque (STT) memory, spin-orbit torque (SOT) memory, nanowire memory, electrically erasable programmable read-only memory (EEPROM), nanotube RAM (NRAM), other memristor- and thyristor-based memory, spintronic magnetic junction-based memory, magnetic tunneling junction (MTJ)-based memory, domain wall (DW)-based memory, and the like, including combinations thereof. The term "memory device" can refer to the die itself and/or to a packaged memory product. NVM can be byte or block addressable. In some examples, NVM can comply with one or more standards promulgated by the Joint Electron Device Engineering Council (JEDEC), such as JESD21-C, JESD218, JESD219, JESD220-1, JESD223B, JESD223-1, or other suitable standard (the JEDEC standards cited herein are available at www.jedec.org). In one specific example, the NVM can be 3D cross-point memory. In another example, the NVM can be planar or 3D NAND flash memory.

A plurality of memory resources 310 can thus include a variety of different combinations of memory pools 314 and memory resource configurations. The three memory resource configurations shown in FIG. 3 are thus merely exemplary, and as such are not considered to be limiting. In these example configurations, memory resource 310a includes a memory pool 314a of volatile memory, memory resource 310b includes a memory pool 314b of NVM configured as a memory/storage pool, and memory resource 310c includes a memory pool 314c of NVM configured as a storage pool. Memory pool 314a can thus have performance characteristics similar to traditional system memory, such as byte-addressability and low latency high bandwidth performance. The volatile memory can include any type of volatile memory, which in some cases include DDRx SDRAM, such as DDR4, for example. While not volatile memory per se, in some cases the volatile memory can include byte-addressable NVM that is configured to function as non-persistent volatile memory by, for example, rendering data stored in the NVM unreadable in response to events that would empty the contents of traditional volatile memory.

Memory pool 314c in this example can have performance characteristics similar to traditional storage memory, such as block addressability, data persistence, and higher latency performance, depending on the type of NVM utilized. Specific nonlimiting examples of NVM for a storage-type memory pool can include planar or 3D NAND flash memory, 3D cross-point memory, and the like, as described above. Memory pool 3b, in this example, represents a hybrid that can have performance characteristics of both volatile and nonvolatile types of memory/memory pools. For example, a hybrid volatile/nonvolatile memory pool can combine the data reliability, high density, large capacity, and lower power consumption characteristics of NVM storage (i.e., persistence) with the lower latency and higher bandwidth performance of volatile memory. One specific nonlimiting example of NVM that can operate as byte-addressable memory or as block-addressable memory is 3D cross-point memory.

These different memory resource/memory pool configurations have different data performance characteristics, and thus will perform differently for different types of application data. Decisions to migrate data from one memory resource to another can thus be made, at least in part, from monitoring and evaluating the application data performance at the current memory resource against other memory resources in the system (e.g., the data center). It is noted, however, that in some cases an evaluation determining that the data performance for an application's data would be increased by migrating the data to another memory pool may not trigger a decision to actually migrate the data. Such may be the case in situations where the application has a lower priority compared to another application, or where the application has a low priority and a threshold performance increase has not been triggered for that priority. Additionally, a higher priority controller in a system such as a data center may override a data migration decision at the memory resource level due to other factors in the data center.

Memory resources 310 each include a memory resource NIC 330 communicatively coupled to the fabric interconnect 308, and a resource controller 332. Compute resources 302 and memory resources 310 can thus communicate through their respective NICs over the fabric interconnect 308. In addition to providing a communication interface, in some cases the NIC 330 can perform address decoding, message routing, and the like, on incoming and outgoing traffic. For example, the NIC 330 can maintain addressing information for the application data located in the memory pool 314. The resource controller 332 controls access to and from the memory pool 314, and can be a part of, or distinct from, the NIC 330. The resource controller 332 can thus receive data transaction requests from the compute resource 302, generate the appropriate memory commands, and perform the requested data transaction on the memory pool 314.

The memory resource 312 can also include a telemetry collector 318 that is configured to collect or otherwise aggregate various status and performance metrics to generate operational telemetry data for application data at the memory resource 310. A telemetry interface 320 can communicatively couple to the telemetry channel 316, thus allowing telemetric communication with other system nodes or resources.

The system further includes an ADME 312 communicatively coupled to the communication interface 308 and further including a PAC 342 and a DEDM unit 344. The system can include any number of ADMEs 312 implemented, for a rack-scale architecture for example, at the data center level, the rack level, the sled level, and the like. In other words, a data center can have one or more ADMEs for the data center, one or more ADMEs per rack, one or more ADMEs per sled, and the like. The ADME 312 can include an ADME telemetry interface 340 for receiving the operational telemetry data that includes data performance metrics from the memory resources 310, and in some cases from the compute resources 302, via the telemetry channel 316.

The PAC 342 can implement various prediction and decision-making schemes to identify situations where migrating an application's data from one memory resource to another can increase performance. For example, the PAC 342 can register a bit-stream utilized to gather the various performance metrics over the telemetry channel 316. Furthermore, in some cases a global data center process ID can used to identify each application running in the system, and the PAC 342 can register and deregister applications accordingly. In one example ID scheme, each application can be registered as being executed in compute resource X and using a set of memory and/or storage disaggregated devices {m1, . . . , mi}{s1, . . . sj}. The global data center process ID can additionally include a list of address ranges to each disaggregated device to which the application is associated.

The operational telemetry data is received by the PAC 342, which can monitor data performance metrics in the operational telemetry data of at least a portion of the memory resources in the system. In one example, the PAC 342 can monitor the application data performance at each memory resource 310 that is application-specific. Through such monitoring, the PAC 342 can make data migration decisions across memory pools 310 that can increase the performances of applications running on compute resources 302. In other words, the PAC 342 can analyze operational telemetry data from across the system to decide when data placed in specific memory resources need to be migrated to other memory resources to improve performance. In addition to migrating data associated with a given application to a memory pool that may have a memory configuration more suited to that specific data, the PAC 342 can also migrate data to underutilized memory resources, thus decreasing the amount of unused bandwidth in the system to increase overall performance.

Referring to FIG. 3 for one example, Application A is executing on compute resource 302a and Application A data is in memory pool 314a of memory resource 310a. Metrics relating to application data performance of memory resource 310a in managing Application A's data is gathered by the telemetry collector 318, a process that similarly occurs at the telemetry collectors 318 in other memory resources 310 for management of resident application data. The telemetry collectors 318 in the memory resources 310 send the application data performance metrics through the telemetry interface 320 to the telemetry channel 316 as operational telemetry data targeted to the PAC 342. If the PAC 342 determines that the application data performance of the data from Application A at memory resource 310a can be increased by migrating the data to memory pool 314b at memory resource 310b, for example, the PAC 342 can send a hold notification 330 through the fabric interconnect 308 to compute resource 302a to hold execution of Application A while the associated data is being migrated. In some examples, the PAC 342 can wait for confirmation from the compute resource 302a that Application A has been successfully paused before proceeding. The PAC 342 also sends a migrate notification to the DEDM 344 to initiate the migration of the Application A data from memory pool 314a in memory resource 310a to memory pool 314b in memory resource 314b. In response, the DEDM 344 generates and sends migrate instructions 332 to the NIC 330 of memory resource 310a to migrate the data, and the resource controller 332 in memory resource 310a generates data commands to send the Application A data to memory resource 310b, as is shown at 334. It is noted that, in some examples, the data for an application may be resident on multiple memory resources. In such cases, the PAC 342 can migrate all of the data or only a portion of the data. Additionally, portions of data on separate memory resources can be migrated and combined at a common memory resource. In other situations, a portion of data can be divided into separate portions and migrated to different memory resources, or one portion can be sent to a different memory resource and the other portion can remain at the original memory resource.

Once the data has been migrated, the PAC 342 can send a resume notification 330 to the NIC 306 of compute resource 302a to resume execution of Application A, along with the updated location of the associated data at memory resource 310b. The NIC 306 of compute resource 302a can then redirect future memory and data requests for the Application A data to the NIC 330 of memory resource 310b. In some cases, the PAC 342 can additionally send a notification to other compute nodes in the system, as is shown for notification 336 to compute node 302b. Such a notification can be used to limit communications to memory resources involved in data migrations, to notify of any Application B data changes resulting from the Application A data migration, and the like. Additionally, the PAC 342 can send notifications to logic of the fabric interconnect 308 to coordinate the data migration, such as by limiting communications through affected portions of the fabric interconnect, for example.

The PAC 342 can be implemented as a processor, controller, field-programable gate array (FPGA), or the like. As has been described, the PAC 342 receives and analyzes the telemetric operation data, which can include application-specific performance metrics, as well as memory resource 310 and compute resource 302 performance metrics, status, and the like. The PAC 342 can then determine when a migration should be triggered, which can be decided according to any of a number of techniques. For example, the decision can be made according to a preset migration policy established according to a service level agreement (SLA), an established level of quality of service (QoS), or the like. In another example, the decision can be based on a migration policy that has been modified over time due to learning by the PAC 342. Such learning can include, for example, any number of machine learning algorithms that can be used to modify the migration policy according to past experiences of the PAC 342. In one example, the PAC 342 can learn that certain memory pools or memory pool regions routinely experience a high level of activity at certain times during each 24-hour period. In other example, the PAC 342 can learn that certain memory pools or memory pool regions routinely experience a high level of activity when certain events are triggered, or certain conditions met. Regardless of the sources of the learning, the PAC 342 can incorporate this experience into an updated migration policy that can be used, not only to migrate data from such high activity zones, but also to take this periodic activity into account when making migration decisions of other data that may be affected during those periods if migrated to those one of those zones.

In another example, the PAC 342 can include a management interface 360 for receiving input from a management controller 362. The management controller 362 can alter the migration policies of the PAC 342, including how aggressively existing migration policies are implemented. The management controller 362 can be implemented at any appropriate level of the system, and can include a user input, an automated response input, and the like.

Figure 4:
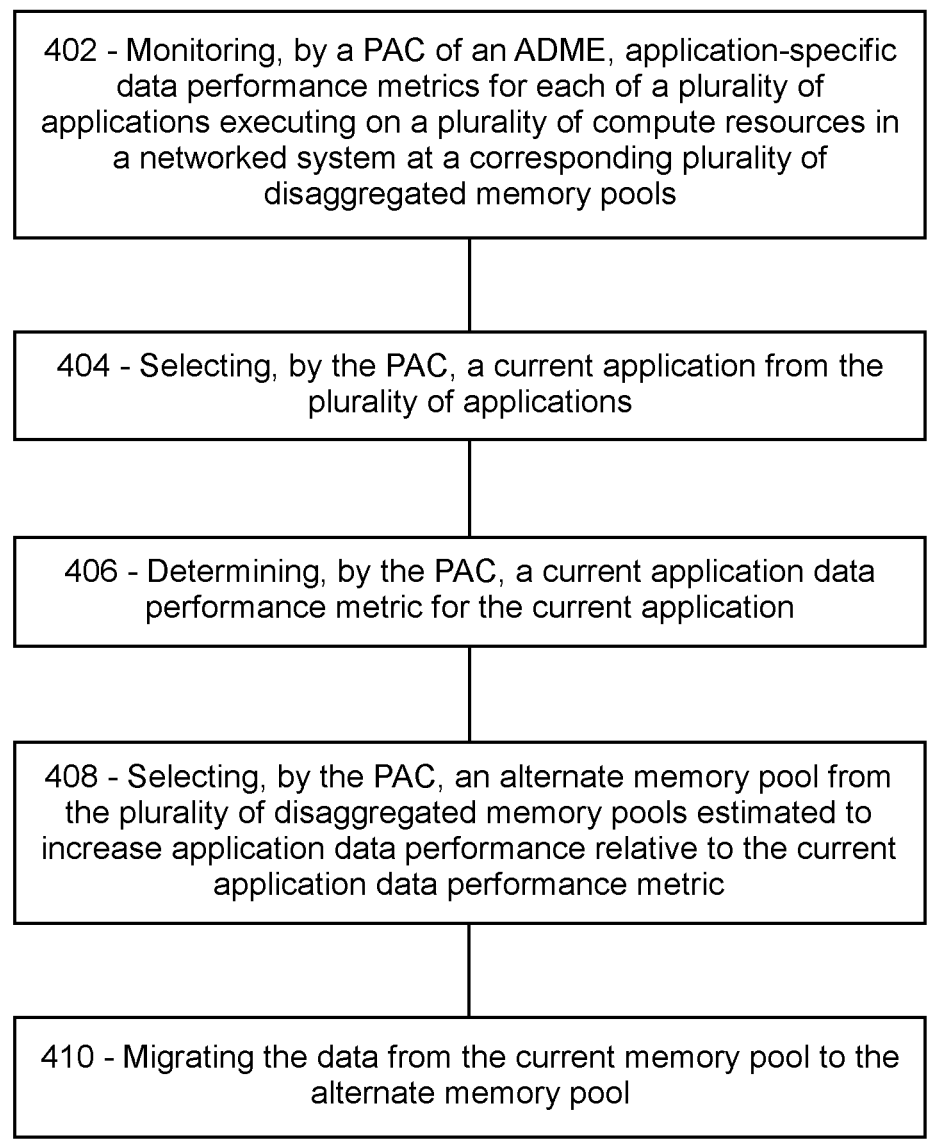
FIG. 4 illustrates a method flow of a computing system in accordance with an example embodiment.

FIG. 4 provides one example of a method of managing application data in a system. The method can include 402 monitoring, by a PAC of an ADME, application-specific data performance metrics for each of a plurality of applications executing on a plurality of compute resources in a networked system at a corresponding plurality of disaggregated memory pools, 404 selecting, by the PAC, a current application from the plurality of applications, and 406 determining, by the PAC, a current application data performance metric for the current application. The method can additionally include 408 selecting, by the PAC, an alternate memory pool from the plurality of disaggregated memory pools estimated to increase application data performance relative to the current application data performance metric and 410 migrating the data from the current memory pool to the alternate memory pool.

EXAMPLES

The following examples pertain to specific embodiments and point out specific features, elements, or steps that can be used or otherwise combined in achieving such embodiments.

In one example, there is provided an acceleration controller device, comprising an adaptive data migration engine (ADME) configured to communicatively couple to a fabric interconnect. The ADME is further configured to monitor application data performance metrics at the plurality of disaggregated memory pools for a plurality of applications executing on the plurality of compute resources, select a current application having a current application data performance metric, determine an alternate memory pool from the plurality of disaggregated memory pools estimated to increase application data performance relative to the current application data performance metric, and migrate the data from the current memory pool to the alternate memory pool.

In one example device, the ADME further comprises a telemetry interface configured to communicatively couple to a telemetry channel and a programmable acceleration controller (PAC) communicatively coupled to the telemetry interface. The PAC is configured to receive operational telemetry data through the telemetry channel from the plurality of disaggregated memory pools, wherein the operational telemetry data includes the application data performance metrics for the plurality of disaggregated memory pools, and to monitor the application data performance metric for the plurality of disaggregated memory pools using the operational telemetry data.

In one example device, to select the current application the PAC is further configured to identify a memory pool of the plurality of disaggregated memory pools having an application data performance metric above a migration threshold and select the memory pool as the current memory pool and the application data performance metric as the current application data performance metric.

In one example device, to determine the alternate memory pool the PAC is further configured to select a memory pool from the plurality of disaggregated memory pools having a memory characteristic that is estimated to increase data processing performance of the data of the current application relative to the current application data performance metric of the current memory pool.

In one example, the device further comprises a data engine data movement (DEDM) engine communicatively coupled to the PAC, and the PAC is further configured to send a migrate notification to the DEDM to migrate the data from the current memory pool to the alternate memory pool. The DEDM is configured to receive the migrate notification from the PAC to migrate the data from the current memory pool to the alternate memory pool and send a data migrate instruction through the fabric interconnect to the current memory pool to migrate the data to the alternate memory pool.

In one example device, the PAC is further configured to send a hold notification to the compute resource executing the current application to pause execution of the current application, wait for confirmation that the current application has been successfully paused, and send a resume notification to the compute resource to resume execution of the current application once the data has been migrated to the alternate memory pool.

In one example device, the PAC is further configured to notify the compute resource of the current application data location at the alternate memory pool.

In one example device, the PAC comprises a field-programmable gate array (FPGA).

In one example device, the telemetry channel is a dedicated communication channel.

In one example device, the dedicated channel is an out-of-band (OOB) channel.

In one example, there is provided a data management system, comprising a plurality of compute resources, a plurality of disaggregated memory pools, a fabric interconnect communicatively coupled between the plurality of compute resources and the plurality of disaggregated memory pools, and an adaptive data migration engine (ADME) configured to communicatively couple to the fabric interconnect. The ADME is configured to monitor application data performance metrics at the plurality of disaggregated memory pools for a plurality of applications executing on the plurality of compute resources, select a current application having a current application data performance metric, determine an alternate memory pool from the plurality of disaggregated memory pools estimated to increase application data performance relative to the current application data performance metric, and migrate the data from the current memory pool to the alternate memory pool.

In one example system, the ADME further comprises a telemetry interface configured to communicatively couple to a telemetry channel, a programmable acceleration controller (PAC) communicatively coupled to the telemetry interface, where the PAC is configured to receive operational telemetry data through the telemetry channel from the plurality of disaggregated memory pools, wherein the operational telemetry data includes the application data performance metrics for the plurality of disaggregated memory pools, and to monitor the application data performance metric for the plurality of disaggregated memory pools using the operational telemetry data.

In one example system, to select the current application the PAC is further configured to identify a memory pool of the plurality of disaggregated memory pools having an application data performance metric above a migration threshold and select the memory pool as the current memory pool and the application data performance metric as the current application data performance metric.

In one example system, to determine the alternate memory pool the PAC is further configured to select a memory pool from the plurality of disaggregated memory pools having a memory characteristic that is estimated to increase data processing performance of the data of the current application relative to the current application data performance metric of the current memory pool.

In one example, the system further comprises a data engine data movement (DEDM) engine communicatively coupled to the PAC, where the PAC is further configured to send a migrate notification to the DEDM to migrate the data from the current memory pool to the alternate memory pool. The DEDM is configured to receive the migrate notification from the PAC to migrate the data from the current memory pool to the alternate memory pool and send a data migrate instruction through the fabric interconnect to the current memory pool to migrate the data to the alternate memory pool.

In one example system, the PAC is further configured to send a hold notification to the compute resource executing the current application to pause execution of the current application, wait for confirmation that the current application has been successfully paused and send a resume notification to the compute resource to resume execution of the current application once the data has been migrated to the alternate memory pool.

In one example system, the PAC is further configured to notify the compute resource of the current application data location at the alternate memory pool.

In one example system, the PAC comprises a field-programmable gate array (FPGA).

In one example system, the telemetry channel is a dedicated communication channel.

In one example system, the dedicated channel is an out-of-band (OOB) channel.

In one example system, the fabric interconnect includes interface circuitry configured to block data operation requests to the current memory pool and to the alternate memory pool when the data is being migrated.

In one example, there is provided a method of managing application data in a system, comprising monitoring, by a programmable acceleration controller (PAC) of an adaptive data migration engine (ADME), application-specific data performance metrics for each of a plurality of applications executing on a plurality of compute resources in a networked system at a corresponding plurality of disaggregated memory pools, selecting, by the PAC, a current application from the plurality of applications, and determining, by the PAC, a current application data performance metric for the current application. The method also includes selecting, by the PAC, an alternate memory pool from the plurality of disaggregated memory pools estimated to increase application data performance relative to the current application data performance metric and migrating the data from the current memory pool to the alternate memory pool.

In one example, the method further comprises receiving, at the PAC, operational telemetry data via a telemetry channel from the plurality of disaggregated memory pools, wherein the operational telemetry data includes the application data performance metrics for the plurality of disaggregated memory pools and monitoring, by the PAC, the application data performance metric for the plurality of disaggregated memory pools using the operational telemetry data.

In one example method, selecting the current application further comprises identifying, by the PAC, a memory pool of the plurality of disaggregated memory pools having an application data performance metric above a migration threshold and selecting, by the PAC, the memory pool as the current memory pool and the application data performance metric as the current application data performance metric.

In one example method, determining the alternate memory pool further comprises selecting, by the PAC, a memory pool from the plurality of disaggregated memory pools having a memory characteristic that is estimated to increase data processing performance of the data of the current application relative to the current application data performance metric of the current memory pool.

In one example method, migrating the data further comprises sending a migrate notification from the PAC to a data engine data movement (DEDM) unit of the ADME to migrate the data from the current memory pool to the alternate memory pool and sending a migrate instruction from the DEDM to the current memory pool to migrate the data to the alternate memory pool.

In one example, the method further comprises sending a hold notification from the PAC to a compute resource executing the current application to pause execution of the current application, waiting for confirmation that the current application has been successfully paused, and sending a resume notification from the PAC to the compute resource to resume execution of the current application once the data has been migrated to the alternate memory pool.

The invention claimed is:

1. An acceleration controller device, comprising:
an adaptive data migration engine (ADME) configured to communicatively couple to a fabric interconnect, the ADME further configured to:
monitor application data performance metrics at a plurality of disaggregated memory pools for a plurality of applications executing on a plurality of compute resources;
select a current application having a current application data performance metric;
determine an alternate memory pool from the plurality of disaggregated memory pools estimated to increase application data performance relative to the current application data performance metric; and
migrate the data from a current memory pool to the alternate memory pool;
wherein the ADME further comprises:
a telemetry interface configured to communicatively couple to a telemetry channel; and
a programmable acceleration controller (PAC) communicatively coupled to the telemetry interface, the PAC being configured to:
receive operational telemetry data through the telemetry channel from the plurality of disaggregated memory pools, wherein the operational telemetry data includes application data performance metrics for the plurality of disaggregated memory pools; and
monitor the application data performance metrics for the plurality of disaggregated memory pools using the operational telemetry data.

2. The device of claim 1, wherein, to select the current application, the PAC is further configured to:
identify a memory pool of the plurality of disaggregated memory pools having an application data performance metric above a migration threshold; and
select the memory pool as the current memory pool and the application data performance metric as the current application data performance metric.

3. The device of claim 2, wherein, to determine the alternate memory pool, the PAC is further configured to select a memory pool from the plurality of disaggregated memory pools having a memory characteristic that is estimated to increase data processing performance of the data of the current application relative to the current application data performance metric of the current memory pool.

4. The device of claim 1, further comprising:
a data engine data movement (DEDM) engine communicatively coupled to the PAC, wherein the PAC is further configured to:
send a migrate notification to the DEDM to migrate the data from the current memory pool to the alternate memory pool, wherein the DEDM is configured to:
receive the migrate notification from the PAC to migrate the data from the current memory pool to the alternate memory pool; and
send a data migrate instruction through the fabric interconnect to the current memory pool to migrate the data to the alternate memory pool.

5. The device of claim 1, wherein the PAC is further configured to:
send a hold notification to a compute resource executing the current application to pause execution of the current application;
wait for confirmation that the current application has been successfully paused; and
send a resume notification to the compute resource to resume execution of the current application once the data has been migrated to the alternate memory pool.

6. The device of claim 5, wherein the PAC is further configured to notify the compute resource of the current application data location at the alternate memory pool.

7. The device of claim 1, wherein the PAC comprises a field-programmable gate array (FPGA).

8. A data management system, comprising:
a plurality of compute resources;
a plurality of disaggregated memory pools;
a fabric interconnect communicatively coupled between the plurality of compute resources and the plurality of disaggregated memory pools; and
an adaptive data migration engine (ADME) configured to communicatively couple to the fabric interconnect, the ADME being configured to:
monitor application data performance metrics at the plurality of disaggregated memory pools for a plurality of applications executing on the plurality of compute resources;
select a current application having a current application data performance metric;
determine an alternate memory pool from the plurality of disaggregated memory pools estimated to increase application data performance relative to the current application data performance metric; and
migrate the data from a current memory pool to the alternate memory pool;
wherein the ADME further comprises:
a telemetry interface configured to communicatively couple to a telemetry channel; and
a programmable acceleration controller (PAC) communicatively coupled to the telemetry interface, the PAC being configured to:
receive operational telemetry data through the telemetry channel from the plurality of disaggregated memory pools, wherein the operational telemetry data includes application data performance metrics for the plurality of disaggregated memory pools; and
monitor the application data performance metrics for the plurality of disaggregated memory pools using the operational telemetry data.

9. The system of claim 8, wherein, to select the current application, the PAC is further configured to:
identify a memory pool of the plurality of disaggregated memory pools having an application data performance metric above a migration threshold; and
select the memory pool as the current memory pool and the application data performance metric as the current application data performance metric.

10. The system of claim 9, wherein, to determine the alternate memory pool, the PAC is further configured to select a memory pool from the plurality of disaggregated memory pools having a memory characteristic that is estimated to increase data processing performance of the data of the current application relative to the current application data performance metric of the current memory pool.

11. The system of claim 8, further comprising:
a data engine data movement (DEDM) engine communicatively coupled to the PAC, wherein the PAC is further configured to:
send a migrate notification to the DEDM to migrate the data from the current memory pool to the alternate memory pool, wherein the DEDM is configured to:
receive the migrate notification from the PAC to migrate the data from the current memory pool to the alternate memory pool; and
send a data migrate instruction through the fabric interconnect to the current memory pool to migrate the data to the alternate memory pool.

12. The system of claim 8, wherein the PAC is further configured to:
send a hold notification to a compute resource executing the current application to pause execution of the current application;
wait for confirmation that the current application has been successfully paused; and
send a resume notification to the compute resource to resume execution of the current application once the data has been migrated to the alternate memory pool.

13. The system of claim 12, wherein the PAC is further configured to notify the compute resource of the current application data location at the alternate memory pool.

14. The system of claim 8, wherein the PAC comprises a field-programable gate array (FPGA).

15. The system of claim 8, wherein the telemetry channel is a dedicated communication channel.

16. The system of claim 15, wherein the dedicated channel is an out-of-band (OOB) channel.

17. The system of claim 8, wherein the fabric interconnect includes interface circuitry configured to block data operation requests to the current memory pool and to the alternate memory pool when the data is being migrated.

18. A method of managing application data in a system, comprising:
monitoring, by a programmable acceleration controller (PAC) of an adaptive data migration engine (ADME), application-specific data performance metrics for each of a plurality of applications executing on a plurality of compute resources in a networked system at a corresponding plurality of disaggregated memory pools;
selecting, by the PAC, a current application from the plurality of applications;
determining, by the PAC, a current application data performance metric for the current application;
selecting, by the PAC, an alternate memory pool from the plurality of disaggregated memory pools estimated to increase application data performance relative to the current application data performance metric;
migrating the data from a current memory pool to the alternate memory pool;
receiving, at the PAC, operational telemetry data via a telemetry channel from the plurality of disaggregated memory pools, wherein the operational telemetry data includes application data performance metrics for the plurality of disaggregated memory pools; and
monitoring, by the PAC, the application data performance metrics for the plurality of disaggregated memory pools using the operational telemetry data.

19. The method of claim 18, wherein selecting the current application further comprises:
identifying, by the PAC, a memory pool of the plurality of disaggregated memory pools having an application data performance metric above a migration threshold; and
selecting, by the PAC, the memory pool as the current memory pool and the application data performance metric as the current application data performance metric.

20. The method of claim 18, wherein determining the alternate memory pool further comprises selecting, by the PAC, a memory pool from the plurality of disaggregated memory pools having a memory characteristic that is estimated to increase data processing performance of the data of the current application relative to the current application data performance metric of the current memory pool.

21. The method of claim 18, wherein migrating the data further comprises:
sending a migrate notification from the PAC to a data engine data movement (DEDM) unit of the ADME to migrate the data from the current memory pool to the alternate memory pool; and
sending a migrate instruction from the DEDM to the current memory pool to migrate the data to the alternate memory pool.

22. The method of claim 18, further comprising:
sending a hold notification from the PAC to a compute resource executing the current application to pause execution of the current application;
waiting for confirmation that the current application has been successfully paused; and
sending a resume notification from the PAC to the compute resource to resume execution of the current application once the data has been migrated to the alternate memory pool.

* * * * *